(12) United States Patent
Ervin et al.

(10) Patent No.: US 8,571,200 B2
(45) Date of Patent: Oct. 29, 2013

(54) INTERACTIVE VOICE RESPONSE SYSTEM AND METHOD WITH COMMON INTERFACE AND INTELLIGENT AGENT MONITORING

(75) Inventors: Matthew J. Ervin, New York, NY (US); Matthew Jones, New York, NY (US); Andrew Kuan, New York, NY (US)

(73) Assignee: The Plum Group, Inc., New York, NY (US)

( * ) Notice: Subject to any disclaimer, the term of this patent is extended or adjusted under 35 U.S.C. 154(b) by 1106 days.

(21) Appl. No.: 12/475,275

(22) Filed: May 29, 2009

(65) Prior Publication Data

US 2010/0091960 A1 Apr. 15, 2010

Related U.S. Application Data

(60) Provisional application No. 61/056,992, filed on May 29, 2008.

(51) Int. Cl.
 *H04M 3/00* (2006.01)
(52) U.S. Cl.
 USPC .................................. 379/265.05; 379/266.01

(58) Field of Classification Search
 USPC ............... 379/265.01, 265.09, 265.11, 88.18; 704/251
 See application file for complete search history.

(56) References Cited

U.S. PATENT DOCUMENTS

| | | | |
|---|---|---|---|
| 6,937,715 B2 * | 8/2005 | Delaney | 379/265.09 |
| 7,542,902 B2 * | 6/2009 | Scahill et al. | 704/251 |
| 2007/0211881 A1 * | 9/2007 | Parker-Stephen | 379/265.01 |
| 2008/0232575 A1 * | 9/2008 | Gumbula | 379/265.11 |

\* cited by examiner

*Primary Examiner* — Mohammad Islam
*Assistant Examiner* — Van D Huynh
(74) *Attorney, Agent, or Firm* — Stroock & Stroock & Lavan LLP

(57) ABSTRACT

A modular interactive voice recognition ("IVR") overlay system and a method of processing calls. The system provides an application server, a plurality of agent workstations and a graphical user interface ("GUI") to allow a hybrid approach to processing calls using an automated IVR and live agents. The system and method allow a single agent to process multiple calls simultaneously and is compatible with existing IVR systems and can be implemented as an add-on to existing IVR systems.

14 Claims, 9 Drawing Sheets

VoiceResolve

Sessions | Active Calls | User Monitor

Sessions | Error Log | Sessions

Billing

| Label | Status | Audio | User Input | Corrected Input | Actions |
|---|---|---|---|---|---|
| First Name | ● | ◉◉ | Scott | | Save Reprompt Transfer |
| Last Name | ● | ◉◉ | Wilson | | Save Reprompt Transfer |
| Credit Card | ● | ◉◉ | 4218000000000000 | | Save Reprompt Transfer |
| Expiration | ● | ◉◉ | 04/09 | | Save Reprompt Transfer |
| Security Code | ● | ◉◉ | 123 | | Save Reprompt Transfer |

Address

| Label | Status | Audio | User Input | Corrected Input | Actions |
|---|---|---|---|---|---|
| City/State | ○ | ◉◉ | New York,NY | | Save Reprompt Transfer |
| Zip | ○ | ◉◉ | 10012 | | Save Reprompt Transfer |
| Street Address | △ | ◉◉ | 131 Varick St. | | Save Reprompt Transfer |
| Phone Number | ○ | ◉◉ | 2125551234 | | Save Reprompt Transfer |

FIG. 4

INTERACTIVE VOICE RESPONSE SYSTEM AND METHOD WITH COMMON INTERFACE AND INTELLIGENT AGENT MONITORING

CROSS REFERENCE TO PRIOR APPLICATIONS

This application claims the benefit of U.S. Provisional Patent Application No. 61/056,992, filed May 29, 2008, which is hereby incorporated by reference in its entirety.

FIELD OF INVENTION

The present invention generally relates to telephone call-centers. Specifically, the present invention relates to an interactive system and method to provide accurate, efficient, and cost-effective processing of calls received at a telephone call-center.

BACKGROUND OF THE INVENTION

Telephone call-centers are widely used in nearly all industries. These call-centers typically provide some form of customer service. The customer service being provided may include technical support, taking and processing orders, processing reservations, confirming the status of a product, etc. Although call-centers can be effective in providing customer service, there is a tension between providing effective call-center based service and the associated costs. Live agents generally provide the most accurate and comprehensive service to callers, however, staffing a sufficient number of live agents to handle a high-volume of calls can be cost-prohibitive. Therefore, in order to handle a high volume of calls and avoid the costs associated with having a sufficient number of live agents, many companies have supplemented, or replaced, live agents with automated interactive voice response ("IVR") applications or systems.

IVR systems may use a speech recognition engine, a voice synthesizer engine, and a computing device running voice extensible markup language ("VXML") browser and scripts. The typical IVR systems can be effective in handling calls that are limited to simple dialogue. These calls include calls where a caller's utterances are generally contained within a clearly defined set of possible utterances. Examples of such calls include calls where the questions require either a "yes" or "no" answer, or calls that request information that is exclusively numerical, etc. IVR systems have proven ineffective at handling more complex call dialogues where a caller's utterance is not necessarily contained within a clearly defined set of utterances. Calls that ask open-ended questions, or require more detailed and unique information such as a mailing address, an electronic mail ("email") address, or even a caller's name can be difficult for current IVR systems to process accurately and efficiently. In these situations, existing IVR systems often misunderstand the caller's utterances. This generally results in wasted time, and the call being routed to a live agent for proper handling, raising costs for call processing and increasing wait times and frustration levels for callers.

SUMMARY OF THE INVENTION

The present invention is directed to a modular IVR overlay system that includes a real-time interactive system and method for the automated processing of telephone calls received at a call-center. In an exemplary embodiment of the present invention, the modular IVR overlay system includes an application server, a plurality of agent workstations, and a graphical user interface ("GUI"). The modular IVR overlay system is designed to be compatible with existing IVR systems, and may be deployed with IVR systems already in use. The modular IVR overlay system is configured to allow a hybrid approach to processing calls, where the functionality of the IVR is supplemented with commands from live agents who are able to listen to the utterances spoken by a caller. This hybrid approach increases the efficiency, effectiveness and accuracy of processing calls. Furthermore, since each agent is able to handle multiple calls simultaneously, or more calls in less time, it eliminates the costs associated with having a large number of dedicated live agents available to process every call. Moreover, the modular IVR overlay system can be deployed with virtually any IVR system that may already be in use, and the use of the modular IVR overlay system is transparent to callers, and operates seamlessly with existing IVR systems to provide accurate, efficient, cost-effective processing of calls.

An exemplary embodiment of a method of processing calls according to the present invention includes a hybrid approach of utilizing an IVR system and live agents for efficient and accurate processing of calls. When a call is received at a call-center, the IVR will operate as programmed, prompting the caller for certain information. As the caller responds to each prompt with an utterance, the IVR generates call-data associated with each utterance given by the caller. The call-data includes a recording of the utterance, a computer generated estimate of the utterance in text form, and a calculated confidence score that is associated with the utterance and the estimate. This call-data is transmitted to an application server, which forwards the call-data to a workstation of a live agent. Fields of a graphical user interface ("GUI") at agent workstations are populated with the call-data associated with each call being processed, allowing an agent to take actions in response to the call-data displayed by the GUI. Based on the collected call-data, the agent has the options of replaying the recorded utterance of the caller, correcting the estimate, confirming the estimate, prompting the caller to repeat the utterance, or conducting a live interaction with the caller.

An aspect of the present invention also includes a method for grouping caller utterances in an application-specific manner based on the type of call being processed. The information collected by the IVR system and used to populate the GUI are grouped in a manner to allow efficient processing of the information by an agent.

Another aspect of an embodiment of the present invention includes an "Autocue" feature. The Autocue feature prioritizes the calls and the utterance of callers and populates each of the GUIs running on the agent workstations. This allows agents to respond to calls with the highest priority first, and take actions associated with calls in an order of decreasing priority.

These and other aspects, features, steps and advantages can be further appreciated from the accompanying figures and description of certain illustrative embodiments.

BRIEF DESCRIPTION OF THE DRAWING FIGURES

The present invention will be more readily understood from the detailed description of exemplary embodiments presented below considered in conjunction with the accompanying drawings, in which:

FIG. 4 is an illustration of a first exemplary screenshot of a GUI presented on an agent workstation in accordance with an embodiment of the present invention;

DETAILED DESCRIPTION OF THE INVENTION

The present invention is directed to a modular IVR overlay system to supplement an interactive voice response ("IVR") system for the processing of calls, and a method for processing calls using the modular IVR system in conjunction with an IVR system.

Figure 1:
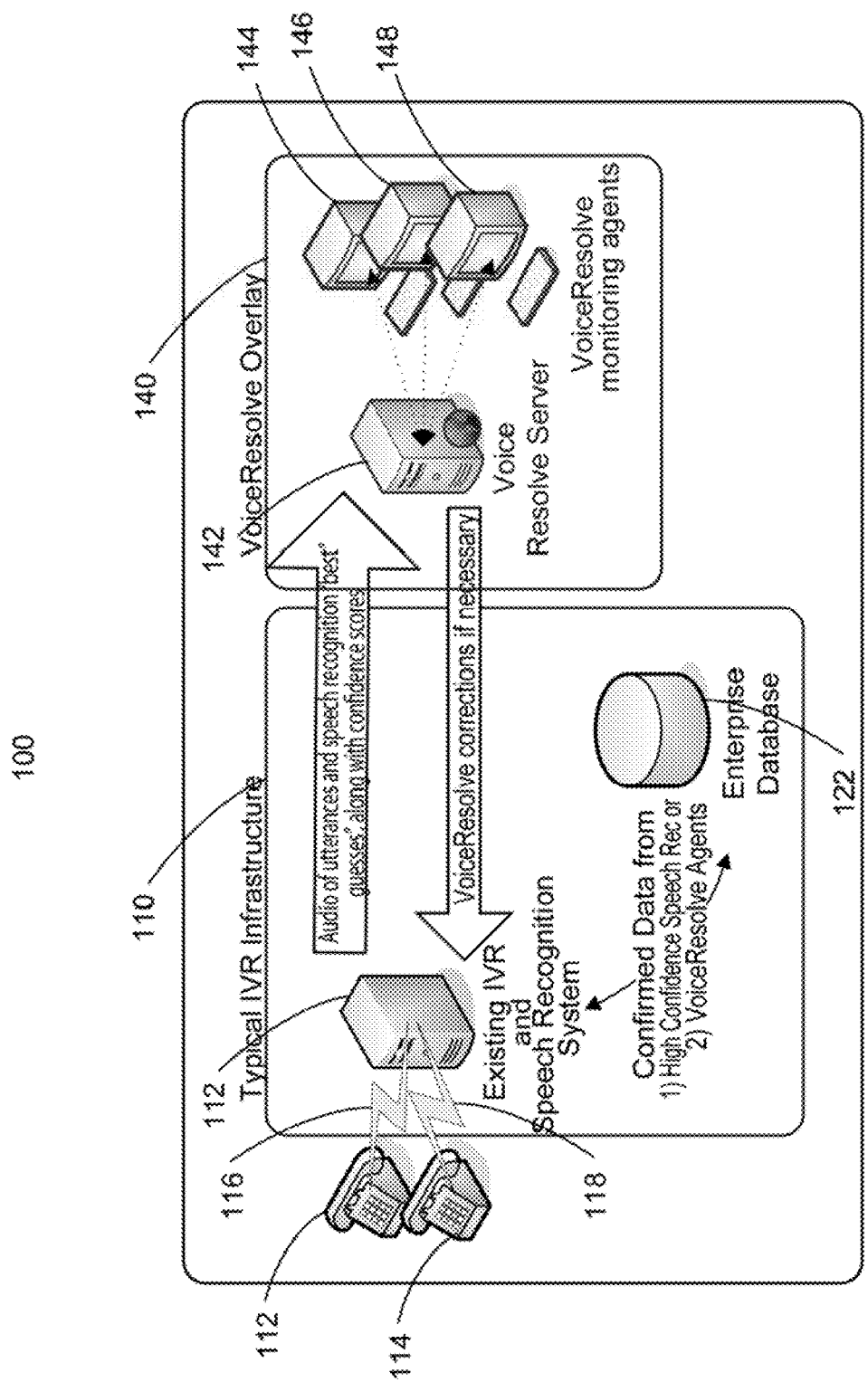
FIG. 1 is an illustration of an exemplary embodiment of an IVR system with the modular IVR overlay system in accordance with the present invention.

FIG. 1 is an illustration of an exemplary embodiment of a system 100 that may be used at call-centers for the processing of calls. The system 100 may include a typical IVR system 110 integrated with a modular IVR overlay system 140 according to an embodiment of the present invention. The system 100 may receive a call from a caller on a phone 112 or 114. The call may be connected to the IVR system 110 at the call-center through a telephone carrier's switching network or some other type of network infrastructure represented by the communications connections 116 and 118. The IVR system 110 may include a server 120 running various applications such as a voice extensible markup language ("VXML") browser, a voice synthesizer software application, and a voice recognition software application. The IVR system 110 may also include a database 122 to store voice data so that voice recognition can be performed by the IVR system 110.

To supplement the IVR system 110, the modular IVR overlay system 140 is deployed with the IVR system 110. The deployment of the IVR overlay system 140 may involve a local or remote connection to the IVR system 110. This connection may be made through virtually any type of network connection, including an Ethernet connection, a T1 connection, a wireless connection, fiber optics, the Internet, wide area network, ("WAN"), local area network ("LAN"), etc. The modular IVR overlay system 140 includes an application server 142 and a plurality of agent workstations 144, 146 and 148. Although the embodiment illustrated in FIG. 1 only shows a single application server and three agent workstations, different implementations of modular IVR overlay system 140 may have various designs and configurations. The various configurations may vary the number of application servers and agent workstations, their locations and connections. The agent workstations 144, 146, and 148 are networked to the application server 142. The network connection may be made via virtually any type of network connection including an Ethernet connection, a T1 connection, a wireless connection, fiber optics, the Internet, wide area network, ("WAN"), local area network ("LAN"), etc. The modular IVR overlay system 140 also includes a graphical user interface ("GUI") application (not shown) running at each of the agent workstations. The GUI presents call-data associated with calls to live agents, and receives commands from the live agents to efficiently and accurately process calls.

During operation of the system 100, the IVR system 110 performs its regular functions of prompting callers for information and receiving the utterances spoken by the callers in response. As a caller is speaking utterances in response to the prompts, the IVR system 110 generates call-data associated with each utterance, including a recording of the utterance, a computer generated estimate of the utterance, and a confidence score associated with the estimate. This call-data may be stored on the server 120. As this call-data is being gathered by the IVR system 110, the application server of the modular IVR overlay system 140 uses "hooks" to request the call-data. The hooks may include standalone software applications or software scripts that run in a browser, and may reside on the application server 142. Further, the application server 142 includes an agent messaging system (not shown) that determines the allocation of calls among the agent workstations 144, 146 and 148, and transmits the call-data to the corresponding workstation. The call-data is presented to an agent at the assigned workstation via the GUI. After analyzing the call-data presented by the GUI, the agent can take actions to correct or confirm the call-data associated with the utterance, instruct the IVR system 110 to re-prompt the caller for the information via the application server 142, or transfer the caller to a live agent. The system can present all of the call-data associated with a single call to a single agent. Alternatively, the system can present distribute the call-data from a single call to multiple agents so that no one agent is presented all the call-data associated with a single call. This is useful for applications such as the reset of passwords where it may be undesirable for a single agent to see all of a caller's sensitive data.

Figure 2:
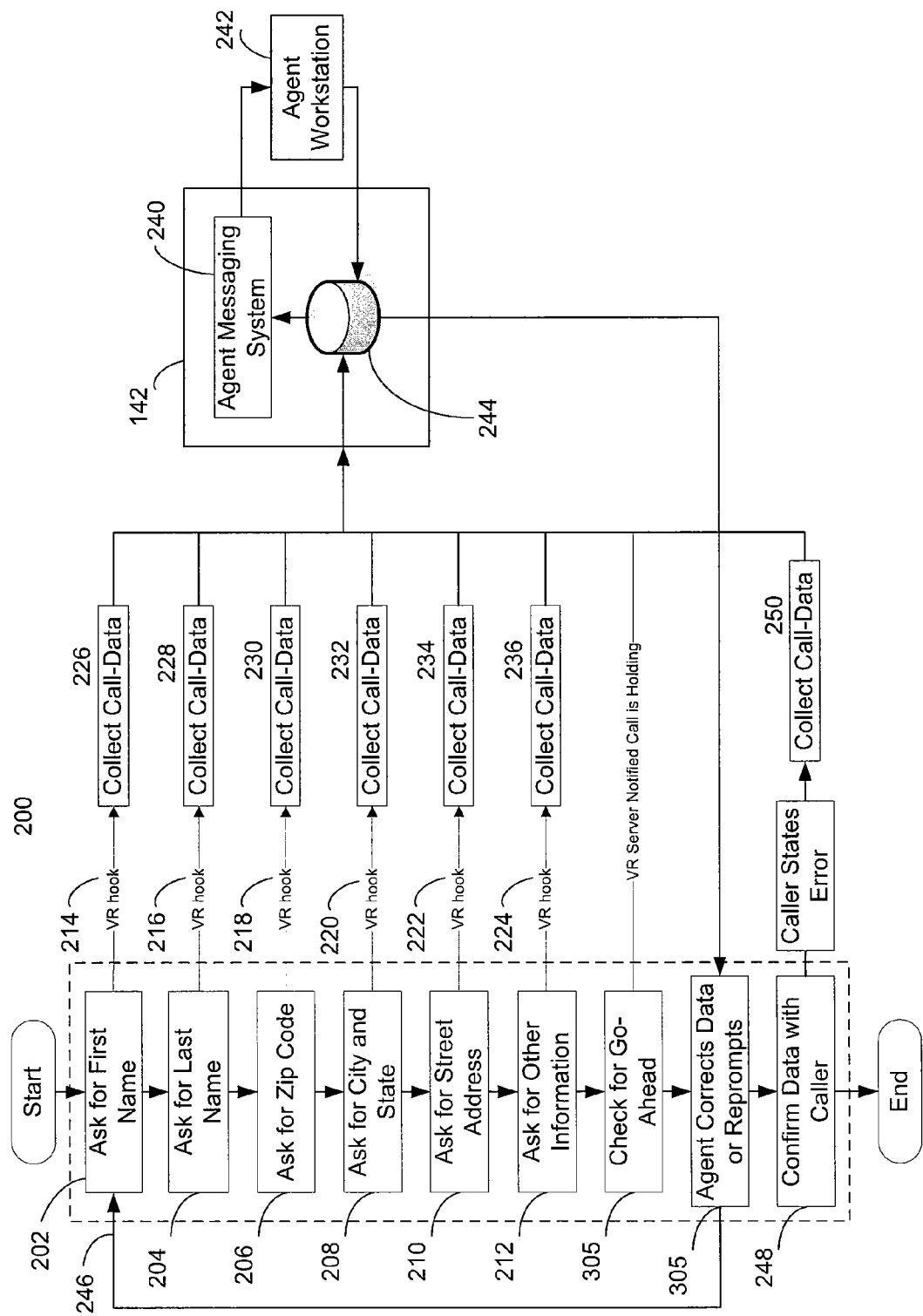
FIG. 2 is an exemplary flow diagram illustrating steps of a call being processed in accordance with an embodiment of the present invention.

FIG. 2 is an exemplary flow diagram of a call-flow 200 being processed by an IVR system with a modular IVR overlay system according to an embodiment of the present invention. The elements of FIG. 2 will be described with reference to the elements and features of the system 100 depicted in FIG. 1, and an embodiment where all the call-data associated with a single call is processed by a single agent. However, the call-flow 200 of FIG. 2 is not confined to the system 100 as shown in FIG. 1, or the embodiment where a single agent processes all the call-data associated with a single call, but is representative of a call-flow of a call being processed by an implementation of a modular IVR overlay system with an IVR system according to the present invention. Accordingly, alternative embodiments in accordance with the present invention where the call-data associated with a single call is distributed among multiple agents may be implemented.

In the call-flow 200, the prompts 202, 204, 206, 208, 210, and 212 are exemplary prompts that the IVR system 110 may present to a caller in acquiring information from the caller in order to process a call. In response to each of the prompts, the caller may speak an utterance to answer each prompt. The "VR hooks" 214, 216, 218, 220, 222, and 224 may include software applications or scripts utilized at the application server 142 of the modular IVR overlay system 140 to request and receive call-data that is generated by the IVR system 110 for each utterance. The call-data for each utterance is illustrated as the call-data blocks 226, 228, 230, 232, 234, and 236.

Each of the call-data 226-236 generated by the IVR system 110 includes a recording of the utterance, an estimate of the utterance in text form, and a confidence score associated with the respective utterance. The hooks 214-224 enable the call-data 226-236 associated with each utterance to be transmitted to the application server 142 of the modular IVR overlay system 140.

At the application server 142, the call-data 226-236 can be saved in a database 244. The call-data 226-236 is then forwarded to an agent messaging system 240 that assigns the call to a specific agent, and transmits one or more of the call-data 226-236 to the workstation 242 of the assigned agent. The workstation 242 may be any of the agent workstations 144-148 in the system 100 of FIG. 1. In selecting a specific agent to process any of the call-data 226-236, the agent messaging system 240 implements an algorithm to generate a priority score for each available agent. First, the agent messaging system 240 determines the status of each agent (e.g., "Active," "On Break," "Logging out," etc.). For each "Active" agent, a priority score is generated. To generate the priority score for each agent, the agent messaging system 240 may consider various statistical information associated with each "Active" agent. Examples of statistical information include the number of active calls, the number of failed utterances, the number of failed utterances in a wait-state, a ratio of completed utterances to total number of utterances, agent response times, caller hold times, and caller satisfaction indicators. These data points can then be combined as a weighted average to calculate the priority score. The priority scores can be used to determine which agent will be assigned a call as it is received in real-time, or an ordered priority queue listing all the available agents can be constructed and continuously updated periodically.

After an agent has been selected, the call-data 226-236 is transmitted to the agent workstation 242 and may populate a GUI (not shown) at the agent workstation 242. In an exemplary embodiment, each call-data 226-236 associated with a specific utterance may populate different fields of the GUI. In addition to presenting the call-data 226-236 to the agent on the agent workstation 242, the GUI is configured so that the assigned agent is able to take certain actions for any of the call-data 226-236. The agent is able to see the confidence score associated with the utterance, listen to the recorded utterance, and see the estimate generated by the IVR system 110. Based on the actions the agent opts to take for each call-data 226-236, the agent may correct the estimate if necessary, confirm that the estimate is correct, instruct the IVR system 110 to re-prompt the caller for the specific utterance, or instruct the IVR system 110 to transfer the call to a live agent. The action taken by the agent is transferred back to the application server 142.

The agent action regarding the call-data 226-236 is used to instruct the IVR system 110 how to proceed in the call-flow 200. If the agent has confirmed and/or corrected all the estimates included in each of the call-data 226-236, the IVR system 110 may confirm the utterances with the caller as shown in block 248, and complete the call. However, if the caller does not confirm the utterances presented in block 248, the caller may be prompted to state the mistake, generating a call-data 250 for the utterance stating the mistake. The call-data 250 is transmitted to the application server 142, and the process is repeated. Additionally, if the utterances are unconfirmed in step 248, the IVR system 110 and the application 142 may be notified that the call is placed on hold, and indicate that the call-data 250 is urgent.

In a situation where the agent is not able to correct or confirm the estimate of a specific call-data for a specific utterance, the agent can instruct the IVR system 110 to re-prompt the caller for the specific utterance. The IVR system 110 will re-prompt the caller as shown with arrow 246. Although arrow 246 is depicted re-prompting the caller for the prompt 202, this is merely exemplary, and the caller may be re-prompted for any of the prompts 202-212. Furthermore, the re-prompt can be executed so that the caller is only required to repeat the one utterance for the specific prompt and not all the prompts in the call-flow 200. After the caller has been re-prompted and the utterance is received by the IVR system 110, the process is repeated for the call-data generated for the re-prompted utterance.

Figure 3:
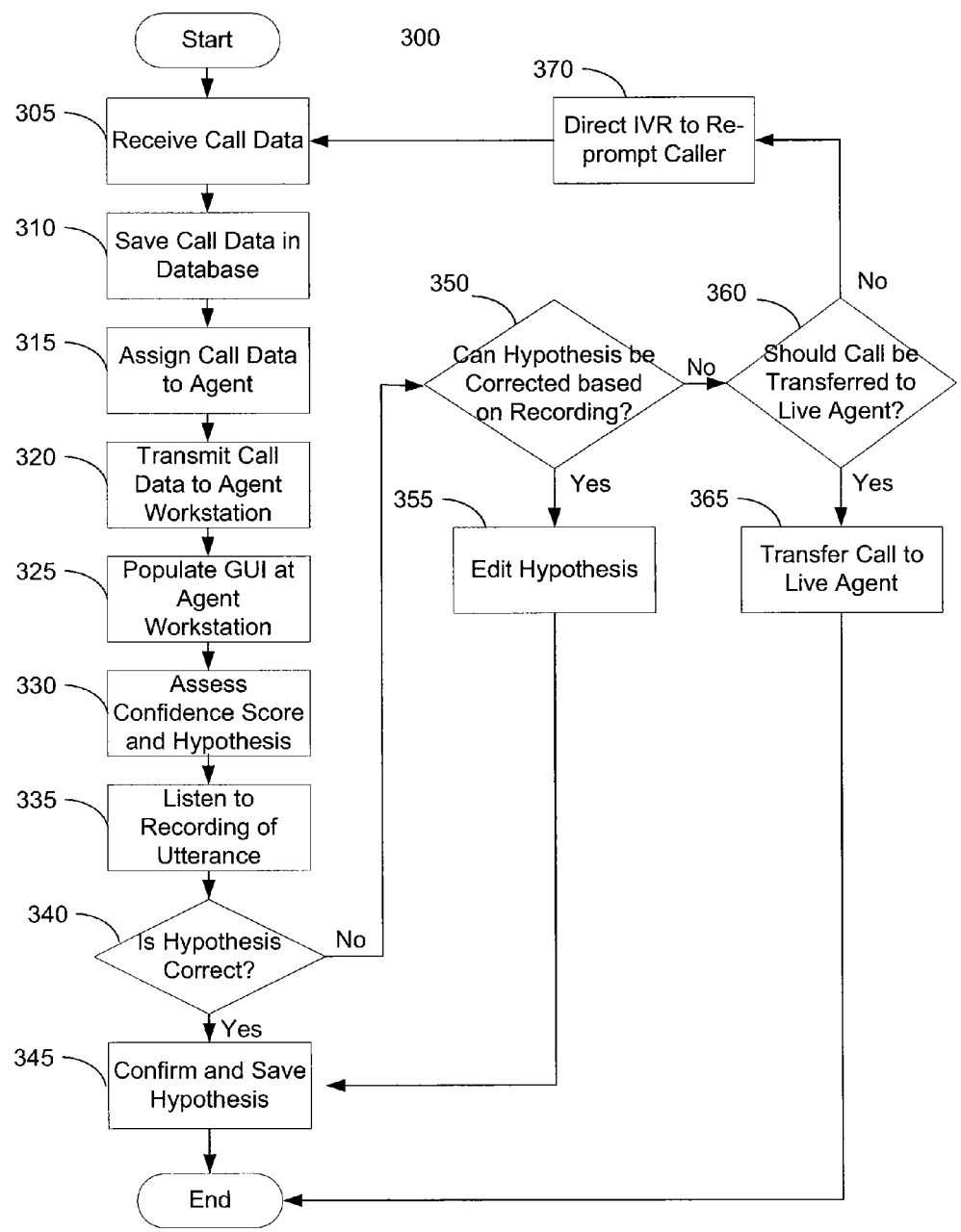
FIG. 3 is an exemplary flow diagram illustrating steps that may be implemented in processing call-data associated with a call being processed in accordance with an embodiment of the present invention.

FIG. 3 is an exemplary flow diagram of a method 300 illustrating the processing of an individual utterance stored as call-data being processed by an IVR system with a modular IVR overlay system according to an embodiment of the present invention. FIG. 3 will be described with reference to the elements and features of the system 100 and the call-flow 200 depicted in FIGS. 1 and 2. However, the method 300 of FIG. 3 is not limited to the system 100 and call-flow 200 as shown in FIGS. 1 and 2, and is only representative of call-data being processed by an exemplary implementation of a modular IVR overlay system with an IVR system according to the present invention. During step 305, the call-data is received by the IVR overlay system 140. The call-data is saved in the IVR overlay system database 142 during step 310. During step 315, the agent messaging system 240 determines which agent to assign the call-data. The call-data is then transmitted to the assigned agent's workstation, and populates a GUI at the agent's workstation during steps 320 and 325. During steps 330 and 335, the agent analyzes the call-data by evaluating the confidence score, the estimate and listening to the recording of the utterance. Based on the assessment of the call-data, it is determined during step 340 whether the generated estimate is correct. If the estimate is correct, it is confirmed and saved during step 345. However, if the estimate is incorrect, the agent determines whether or not it can be corrected based on the recording. If a determination can be made, the agent edits the estimate to accurately reflect the utterance of the caller during step 355, and proceeds to save and confirm the edited estimate. If the agent cannot make a determination, the agent considers whether the call should be transferred to a live agent during decision block 360. This determination may be based on, for example, the complexity of the information requested, the complexity of the reason for the call, the quality of the call and/or recording, availability of live agents, etc. Based on this determination, the call is either transferred to a live agent during step 365, or the agent instructs the IVR system 110 to re-prompt the caller for the information during step 370.

FIG. 4 is an exemplary screen shot of a graphical user interface ("GUI") 400 that is configured to display call-data and receive agent commands on agent workstations. The elements of FIG. 4 will be described with reference to the elements and features of system 100 depicted in FIG. 1, the call-flow 200 of FIG. 2 and method 300 of FIG. 3. However, the GUI 400 of FIG. 400 is not limited to the descriptions used in reference to FIGS. 1, 2, and 3, and may be representative of a GUI according to any implementation of a modular IVR overlay system with an IVR system according to the present invention. The GUI 400 may be a browser-based script as shown in FIG. 4, or a separate stand alone software application. The GUI 400 may include several session tabs 402, 404, 406, and 408, where each session tab corresponds to a different call.

The agent workstation 242 receives the call-data 226-236 from the agent messaging system 240. The call-data 226-236 populates fields 420, 422, 424, 426, 428, 430, 432, 434, and 436 associated with the call corresponding to session tab 406. Each field 420-436 may be populated with call-data associated with a single utterance, and may include an entry 446 containing the estimate generated by the IVR system 110. Further, the call-data associated with each utterance populates the GUI 400 in a logical application-specific manner based on the type of call being processed for efficient processing of the call. Examples of such groupings include: name and address; various call-data associated with credit card information (e.g., credit card number, expiration date, etc.); various call-data associated with account information (e.g., account number, social security number, etc.); various call-data associated with employee information (e.g., employee identification, date of birth, social security number, etc.); and various call-data associated with date information (e.g., month, day, year, etc.).

Furthermore, the GUI 400 may also include audio buttons 444 that allow the agent to listen to the recorded utterance included in the call-data 226-236. The GUI 400 may further include a status indicator 442, that may be based on the confidence score contained in the call-data 226-236. The GUI 400 may also include action buttons 450 that allow the agent to take actions in response to the call-data for each utterance. The agent can confirm the estimate is correct or enter a corrected utterance in a form 448. Alternatively, the agent can instruct the IVR system 110 to re-prompt the caller for the specific utterance, or transfer the call to a live agent.

Figure 5:
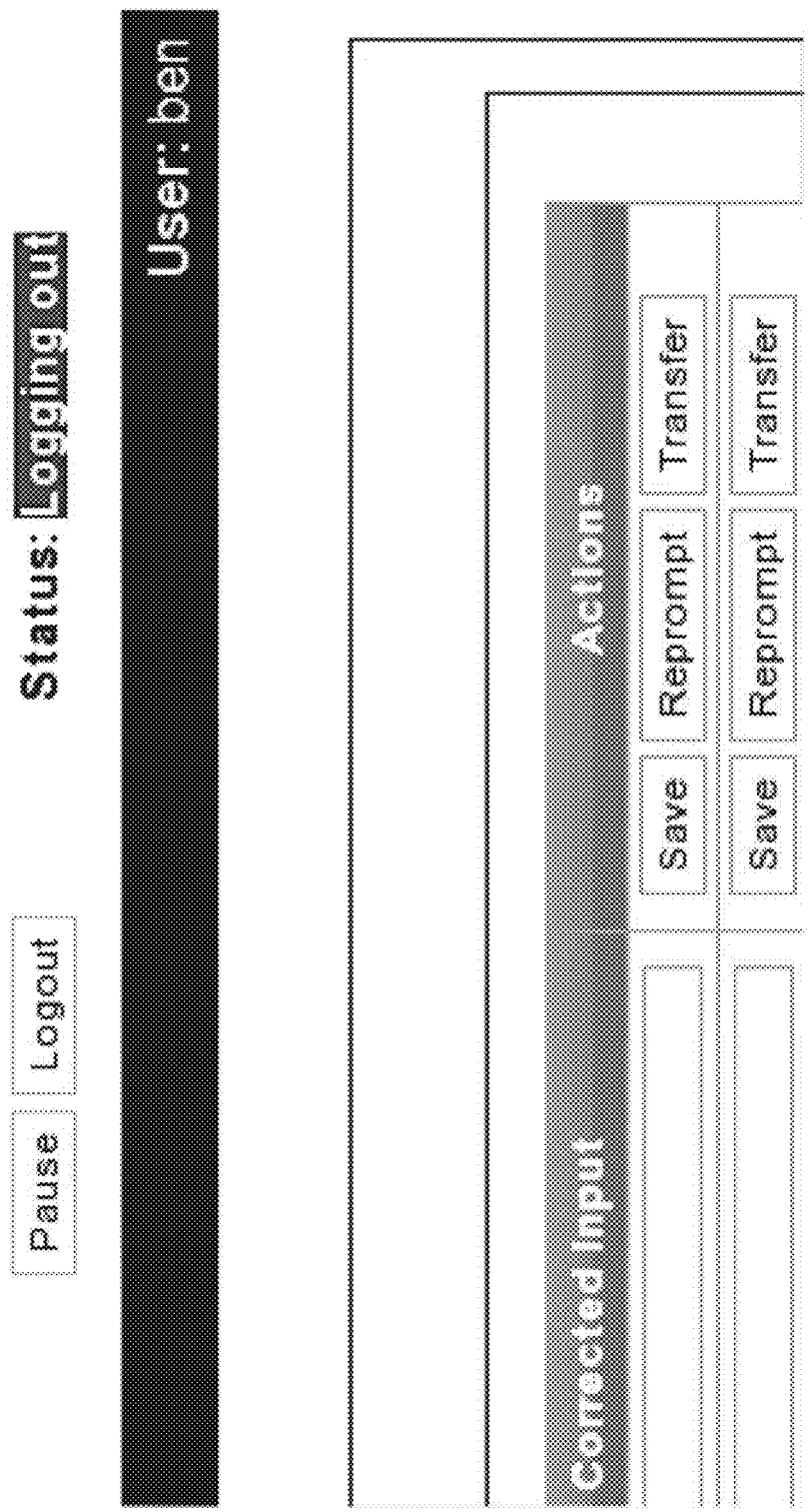
FIG. 5 is an illustration of another exemplary screenshot of a GUI presented on an agent workstation in accordance with an embodiment of the present invention.
Figure 6:
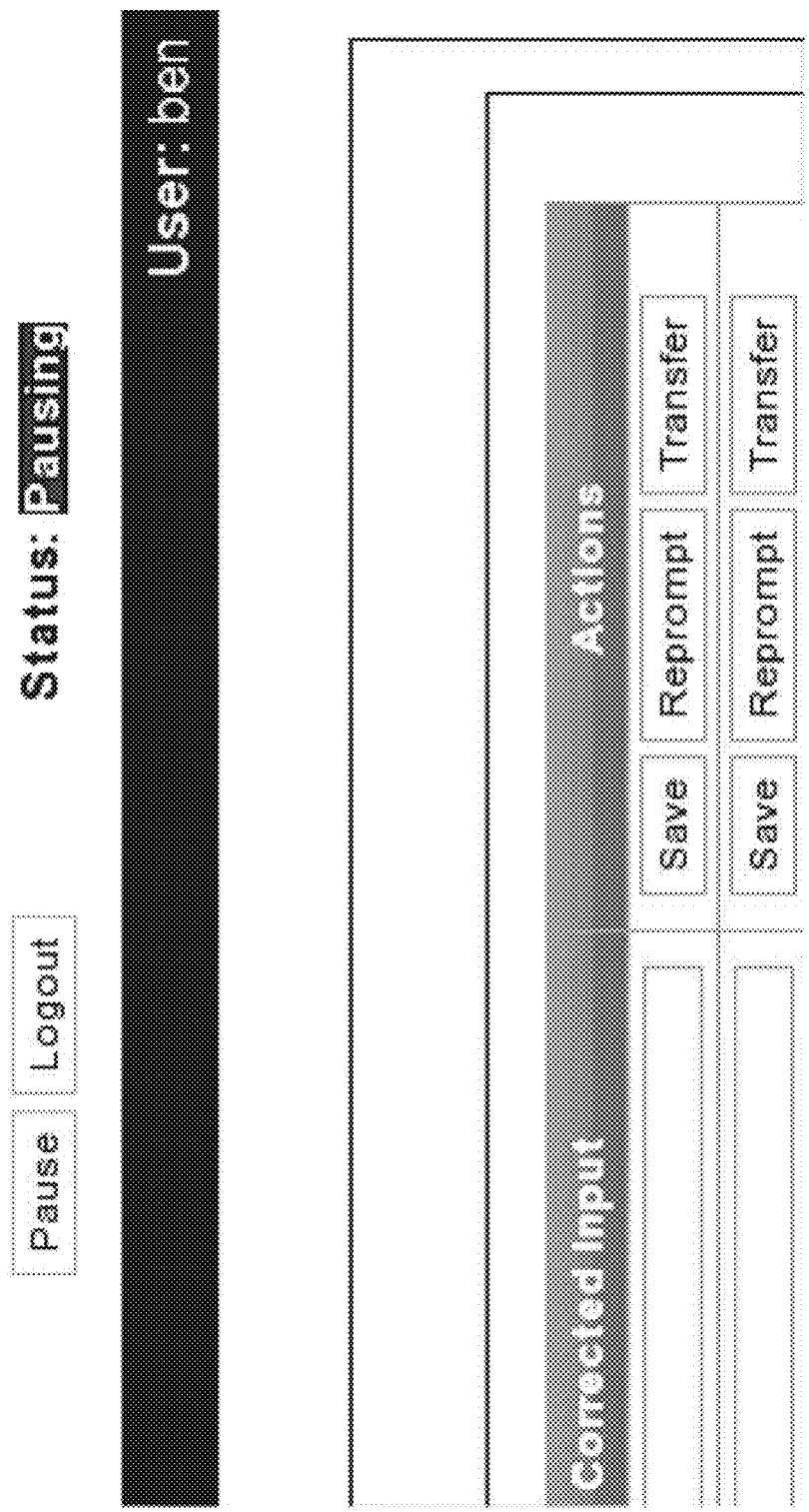
FIG. 6 is an illustration of another exemplary screenshot of a GUI presented on an agent workstation in accordance with an embodiment of the present invention.
Figure 7:
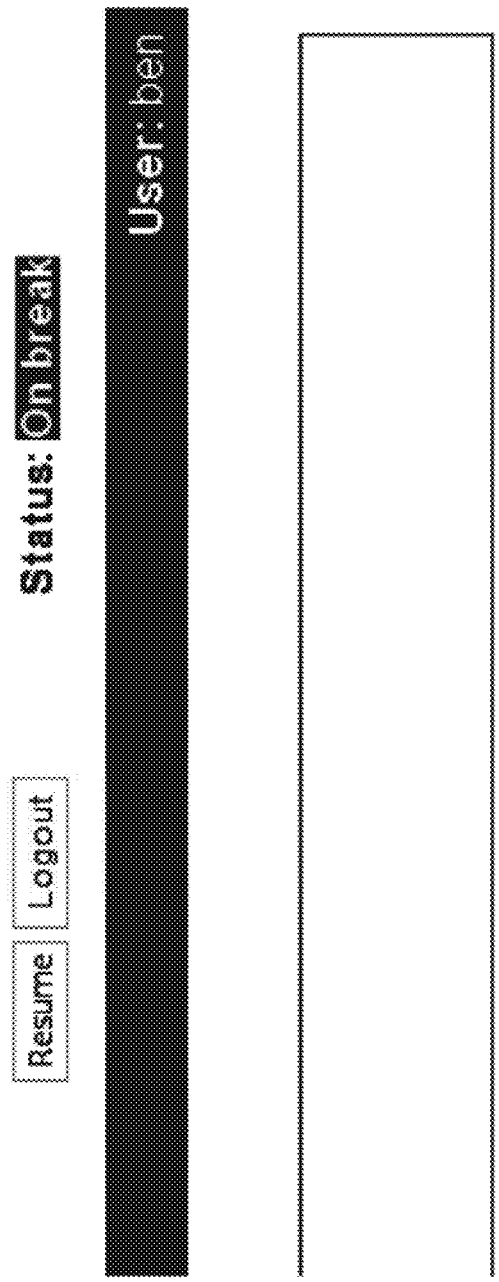
FIG. 7 is an illustration of another exemplary screenshot of a GUI presented on an agent workstation in accordance with an embodiment of the present invention.
Figure 8:
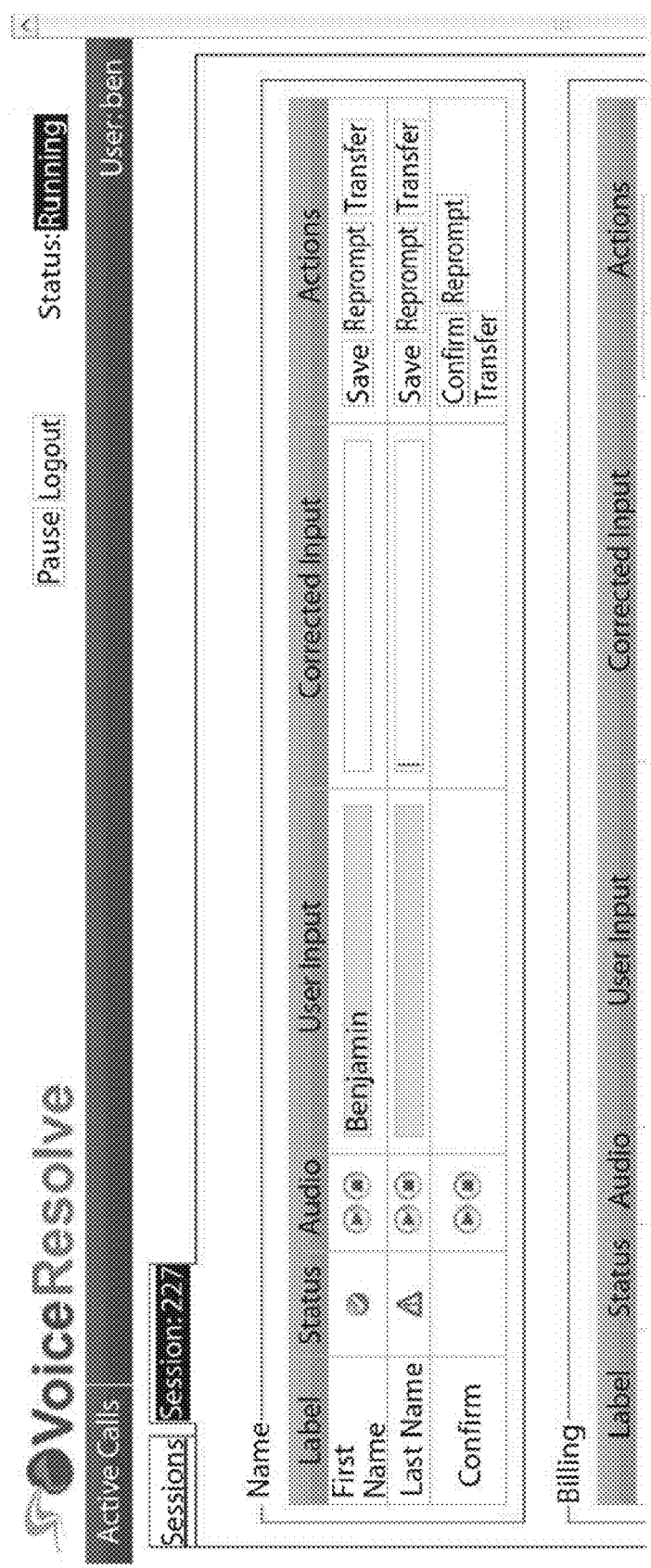
FIG. 8 is an illustration of another exemplary screenshot of a GUI presented on an agent workstation in accordance with an embodiment of the present invention.
Figure 9:
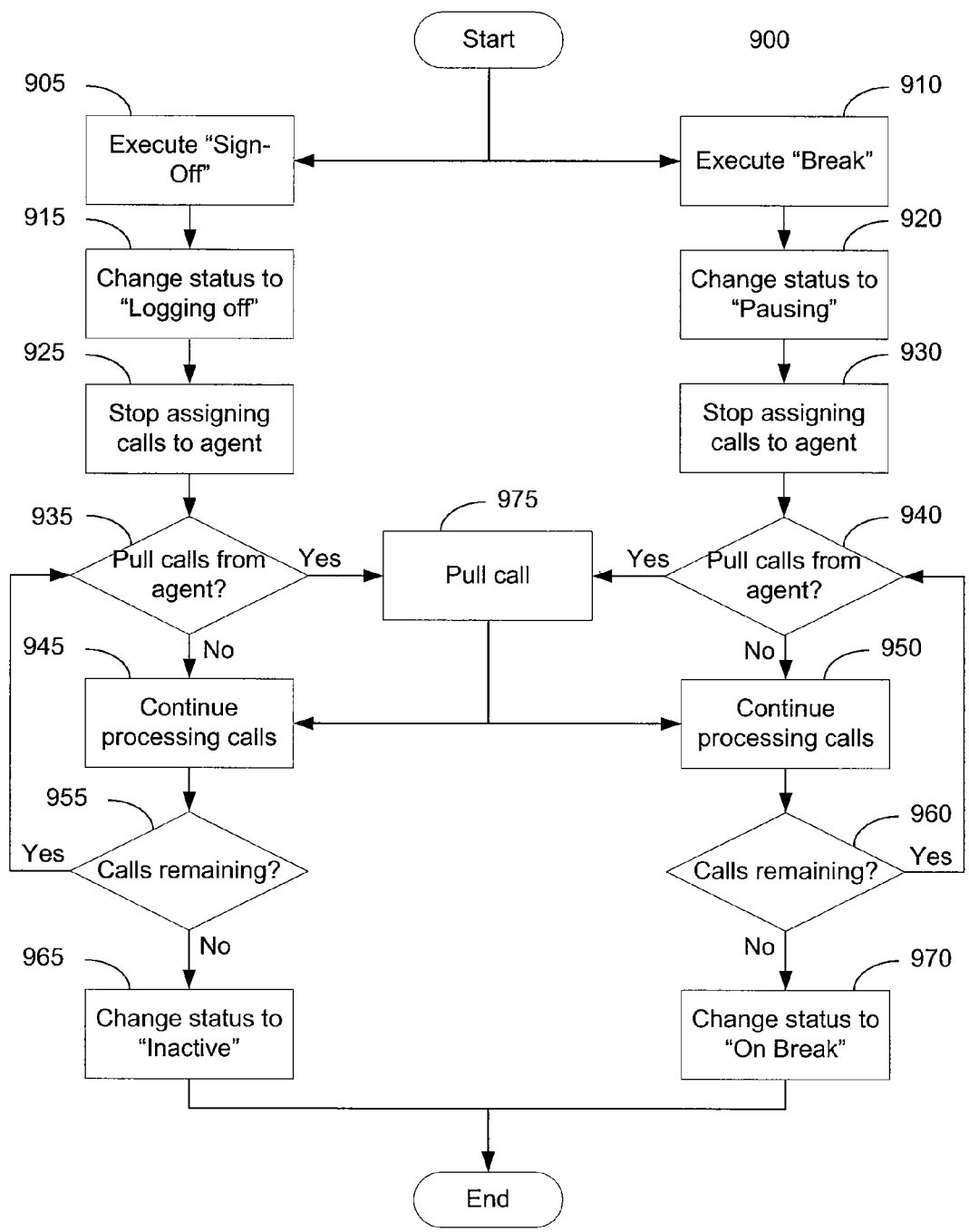
FIG. 9 is an exemplary flow diagram illustrating steps in changing an agent's status in accordance with an embodiment of the present invention.

In addition to the features of the GUI 400 that allow the agents to process the calls and the call-data, the GUI 400 may also include "Sign-off," and "Break" functions, as shown in FIGS. 5-9. FIGS. 5-8 show various screen shots of an implementation of the GUI 400 showing the status of the agent. FIG. 5 shows the status of an agent in the signing-off process. FIG. 6 shows the status of an agent who is in the process of going on break. FIG. 7 shows the status of an agent who is on break. FIG. 8 shows the status of an agent who is active. Further, FIG. 9 shows an exemplary flow diagram of a method 900 illustrating the steps that may be implemented in executing a "Sign-off" or "Break" request according to an embodiment of the present invention.

The "Sign-off" and "Break" features of the GUI 400 work in conjunction with the agent messaging system 240 and the method 200. An agent can activate the "Sign-off" or "Break" feature via the GUI 400 as shown in steps 905 and 910. Next, the agent's status will be changed to "Logging off" or "Pausing", respectively, as shown in steps 915 and 920. This ensures that the agent messaging system 240 is aware that the agent is either going on break or in the process of signing off, and will not direct any more calls to the agent during steps 925 and 930. After all of the agent's calls have been processed, the agent's status is changed to unavailable or "On break" during steps 965 and 970. Optionally, as shown in decision blocks 935 and 940 and step 975, the agent messaging system 240 can pull calls already assigned to an agent workstation from an agent in the process of logging out or going on break to expedite this process, and re-assign the calls to "Active" agents.

Further, the GUI 400 may include an AutoCue feature (not shown). The Autocue feature of the GUI 400 prioritizes to ensure that the calls or utterances with the highest priority are processed efficiently and effectively. AutoCue enables the agent to work passively, allowing the agent to wait for the GUI to prioritize the work flow and present the agent with the next utterance to be processed. In an exemplary embodiment in accordance with the present invention, the AutoCue feature analyzes all of the currently active call-data blocks currently in each agent's queue to determine the age of each of the blocks. Based on this information, the AutoCue feature generates a queue so that the older calls are given a higher priority. The active call-data blocks are then arranged according to the queue so that the older, and thus higher priority calls, are processed first. Other factors that may be considered in prioritizing the calls is the importance of each call, and an estimated time that is required to complete processing of the call. This feature reduces wait times that callers may experience, and also processing times associated with calls.

To further assist the agent, the AutoCue feature may optimize the configuration of the GUI screen presented to the agent for each utterance that is prioritized according to the AutoCue that is being processed by the agent. In an exemplary embodiment, a "First Name" field included in the GUI may be highlighted and selected as the utterance is being played for the agent. This may allow the agent to immediately edit the field without first selecting the field via a keystroke or a click with a computer mouse. Additionally, after the agent completes processing an utterance prioritized by the AutoCue feature, the AutoCue feature may select and prepare the utterance with the next highest priority in a similar manner to allow seamless processing of the prioritized list of utterances by the agent. Thus, the AutoCue feature allows the agent to focus on utterances in an order of decreasing priorities.

Additionally, call-data that has been confirmed by a caller or entered by an agent may be stored to optimize the voice-recognition capabilities of the IVR. The stored data may include the call-data, including an utterance and an accurate interpretation of the utterance. This data may be compiled and archived and may be accessed by the IVR to improve and expand the speech recognition capabilities of the IVR.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for interactively processing calls in conjunction with an interactive voice response ("IVR") system, comprising the steps of:
   providing at least one item of call-data associated with a respective one of a plurality of calls being processed by the IVR;
   assigning at least one of the plurality of call-data to one of a plurality of agent workstations;
   transmitting the at least one call-data to the assigned agent workstation;
   prioritizing the call-data presented to the agent;
   arranging the call-data in an order of decreasing priority;
   presenting the at least one call-data at the assigned agent workstation via a graphical user interface ("GUI");
   playing an audio utterance associated with the call-data with highest priority that has not already been processed;
   receiving at least one of a plurality of agent commands through the GUI; and
   processing the at least one call-data based on at least one of the call-data provided by the IVR and the agent commands received from the GUI.

2. The method of claim 1, wherein the step of prioritizing is based on at least one of a period of time the call with which the call-data is associated has been on hold, an importance of the call with which the call-data is associated, and an estimated period of time the call with which the call-data is associated will take to process.

3. The method of claim 1, further comprising the step of:
optimally configuring the GUI according to the audio utterance being played.

4. The method of claim 1, further comprising the steps of:
using the IVR to playback the at least one call-data;
using the IVR to request instructions for correcting at least one error in the at least one call-data;
receiving instructions for correcting the error;
presenting the at least one call-data to the agent;
presenting the instructions for correcting the error; and
enabling the agent to correct the call-data based on at least one of the instructions and the call-data while the system is still connected to the call.

5. The method of claim 1, wherein the step of assigning of the call-data further comprises assigning the call-data associated with a call to more than one agent.

6. The method of claim 1, further comprising the step of:
tracking a performance of at least one of the plurality of agents based on at least one of a number of calls actively monitored by the agent, a number of utterances in the agent's cue, a number of failed utterances, a number of failed utterances in a wait-state, a ratio of completed utterances to total number of utterances, an agent response time, a call hold time, and a call satisfaction indicator.

7. The method of claim 6, further comprising the steps of:
deriving a priority score for the agent from the tracked performance;
prioritizing the agent based on the priority score;
arranging the agent in an order of decreasing priority; and
assigning call-data to the agent based on the order of decreasing priority.

8. The method of claim 1, further comprising the steps of:
storing call-data and the agent commands associated with the call-data; and
updating the IVR with the call-data and the associated agent commands;
wherein the updated IVR program can access the stored call-data and associated agent commands for improved processing of calls.

9. The method of claim 8, further comprising the step of:
automatically updating the IVR program with the call-data and the associated agent commands.

10. A modular interactive voice response ("IVR") overlay configured to integrate with an IVR system, comprising:
an application server configured to request at least one call-data from the IVR system and allocate the at least one call-data to at least one agent workstation, the at least one agent workstation being networked with the application server,
wherein the application server is further configured to prioritize the at least one call-data allocated to the at least one agent station, to arrange the at least one call-data in an order of decreasing priority, and to present the at least one call-data at a graphical user interface ("GUI") of the at least one agent workstation, wherein the GUI is configured to present the at least one call data and allow at least one of a processing and a manipulation of the at least one call-data; and wherein the GUI is further configured to receive agent commands including at least one agent command for playing an audio utterance of the at least one call data with the highest priority that has not been processed, and wherein the application server is further configured to process the at least one call-data based on the agent commands received from the GUI.

11. The modular IVR overlay of claim 10, wherein the modular IVR overlay is networked with the IVR system.

12. The modular IVR overlay of claim 10, wherein the processing and manipulation of the at least one call-data is performed via the plurality of user selectable commands.

13. The modular IVR overlay of claim 10, wherein the allocation is based on a prioritization of the at least one call-data.

14. A programmed processor configured to process calls in conjunction with an interactive voice response ("IVR") system, the processor configured to:
provide at least one item of call-data associated with a respective one of a plurality of calls being processed by the IVR;
assign at least one of the plurality of call-data to one of a plurality of agent workstations;
transmit the at least one call-data to the assigned agent workstation;
prioritize the call-data presented to the agent;
arrange the call-data in an order of decreasing priority;
present the at least one call-data at the assigned agent workstation via a graphical user interface ("GUI");
play an audio utterance associated with the call-data with highest priority that has not already been processed;
receive at least one of a plurality of agent commands through the GUI; and
process the at least one call-data based on at least one of the call-data provided by the IVR and the agent commands received from the GUI.

* * * * *